Dec. 1, 1959     H. N. WOEBCKE     2,915,299
APPARATUS FOR CONTROLLING TEMPERATURES
Filed Dec. 19, 1956
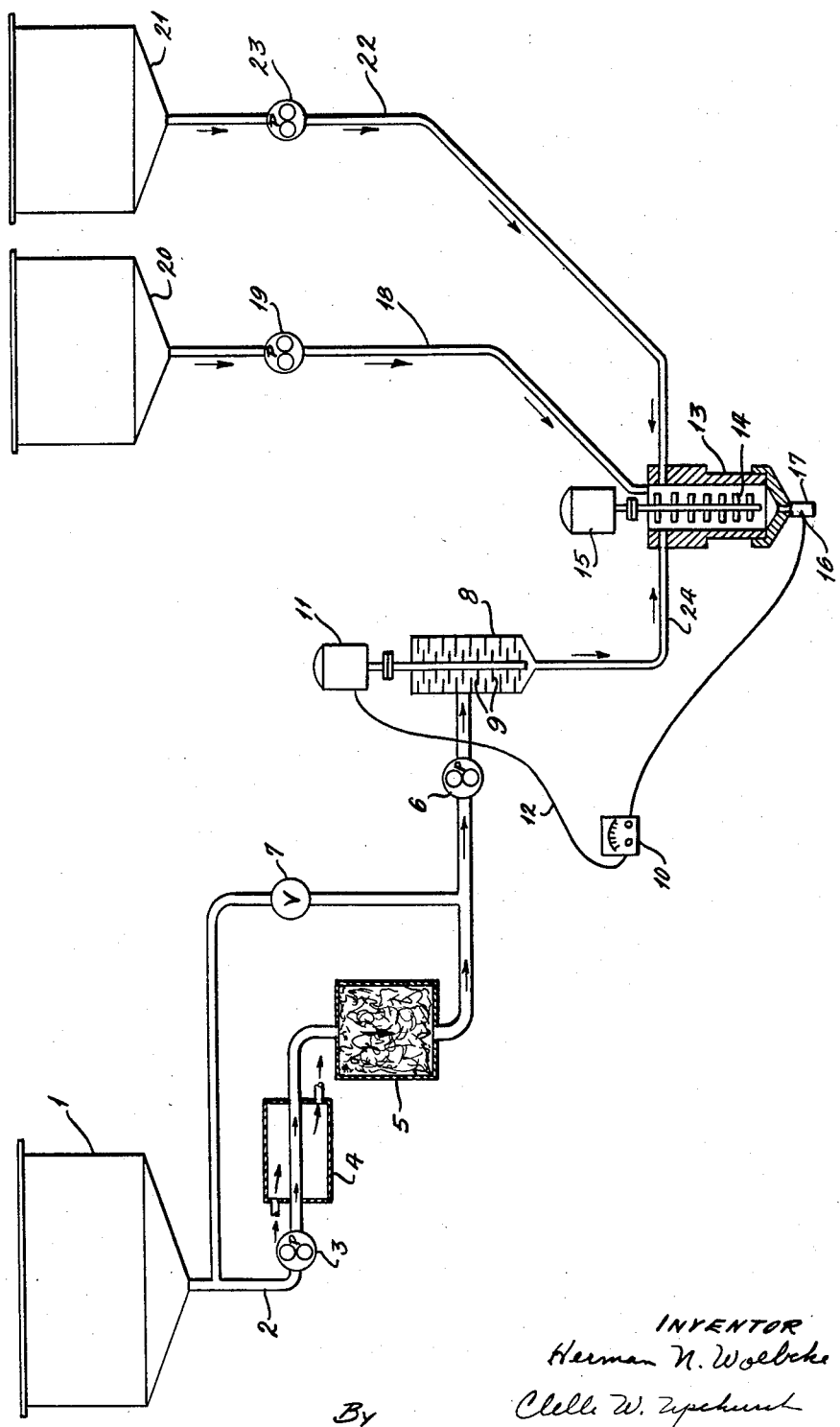
INVENTOR
Herman N. Woebcke
By Clelle W. Upchurch
ATTORNEY.

United States Patent Office 2,915,299
Patented Dec. 1, 1959

2,915,299

APPARATUS FOR CONTROLLING TEMPERATURES

Herman N. Woebcke, St. Louis, Mo., assignor to Mobay Chemical Company, St. Louis, Mo., a corporation of Delaware Application December 19, 1956, Serial No. 629,386

2 Claims. (Cl. 259—8)

This invention relates generally to an apparatus for heating a viscous liquid and more particularly to an apparatus for regulating the temperature of a mixture of liquid components used in the manufacture of a polyurethane plastic.

Polyesters, mixtures thereof with other chemicals, and other similar viscous liquids used in the manufacture of plastics, such as, for example, polyurethane plastics, often must be mixed with the other components of the plastic while within a particular temperature range in order that the resulting mixture will be at the proper temperature and the resulting plastic will have the desired chemical and physical properties. It has been the practice heretofore to provide apparatus for making polyurethane plastics with heat exchangers composed of tubes of considerable length for heating the more viscous liquids such as polyesters. Tubes of substantial length are required because of the low heat conductivity of the viscous polyester. Such lengths of tubing have the disadvantage, however, of being very difficult to clean and expensive to manufacture. It has been suggested that the tubular heat exchangers be replaced with tanks having a steel jacket or other means for heating them, but such tanks have not been found to be suitable because of the long time required to change the temperature of the solution to any appreciable extent.

It is therefore an object of this invention to provide an improved means for changing the temperature of a viscous liquid. Another object of the invention is to provide an apparatus and process for making plastics, such as, for example, polyurethane plastics, having an improved means for heating viscous components of the resulting plastic and for controlling the temperature of the mixture of components. Still another object of the invention is to provide an efficient and simplified apparatus for heating viscous liquids having a low thermal conductivity and for using the heated liquid to control the temperature of a mixture of the liquid with other components of a plastic composition. A further object of the invention is to provide a combination of an apparatus for mixing together the various components of a plastic and an improved means for heating the viscous components of the resulting plastic to a predetermined and regulated temperature range. A still further object of the invention is to provide a means for regulating the temperature of a mixture of components of a polyurethane plastic.

Other objects will become apparent from the following description with reference to the accompanying diagrammatic drawing of one embodiment of the invention.

In accordance with this invention, generally speaking, the foregoing objects and others are accomplished by providing a means for subjecting a viscous liquid to internal friction or mechanical energy, means for mixing the resulting heated liquid with other components of a plastic composition, means for measuring the temperature of the resulting mixture of components, and means responsive to the temperature to regulate the amount of mechanical energy utilized based on the temperature of the mixture. More specifically, the invention contemplates an apparatus for making plastics, for example, polyurethane plastics, which combines a means for stirring or agitating a viscous liquid, such as, for example, a polyester, until the temperature of the liquid has increased with a means for mixing the heated liquid with other components of the plastic, a means for measuring the temperature of the resulting mixture, and means responsive to the temperature to actuate the stirrer. It has been found that the temperature of a polyester can be raised by as much as 20° to 30° F., or more, by the beating action of a stirrer and that the temperature of the polyester is increased by an amount which is proportional to the mechanical energy added to the stirrer per unit of polyester through-put.

In practicing a preferred embodiment of the invention, a means for heating the viscous liquid component of a plastic composition is installed between the storage vessel for the component and the zone where the viscous component is mixed with the other components in preparing the plastic composition. Various types of plastics may be produced by this process and various types of mixing apparatus may be combined with the heating device, but it is preferred to combine the heating device with the apparatus disclosed in U.S. Patent 2,764,565, issued to Hoppe et al., September 25, 1956. The apparatus described and illustrated in copending application Serial No. 585,077, filed May 15, 1956, now U.S. Patent No. 2,857,144, by J. F. Gurley, Jr., and myself may be combined with the apparatus of the instant application to form another preferred embodiment of this invention. The apparatus provided by this invention has proved to be particularly well suited for use in making polyurethane plastics such as those disclosed in the aforesaid patent. These plastics may be either porous or homogeneous polyurethanes of rigid, semirigid or elastic consistency. Any of the various polyesters disclosed in the patent may be heated in accordance with this invention and the temperature of the various plastic compositions disclosed in the patent may be controlled at a predetermined temperature by means of the apparatus provided by this invention.

In a preferred embodiment of the invention, the conduit leading from the storage tank containing the viscous liquid is interrupted by a chamber provided with a stirrer. The chamber has inlet and outlet means and the polyester or other viscous liquid is pumped through the conduit and through the stirring chamber at a predetermined and controlled flow rate. A thermocouple or other means for measuring the temperature of the liquid is inserted near the outlet. A variable-speed motor or other means drives the stirrer responsive to a temperature controller associated with the thermocouple.

Referring now to the accompanying drawing, an embodiment of the invention is shown diagrammatically. Storage tank 1 is provided for the viscous liquid, such as, for example, the polyester. This liquid is drawn through conduit 2 by means of pump 3 and passes through heat exchanger 4 where the temperature of the polyester may be reduced to below room temperature, if desired. The liquid moves from heat exchanger 4 to filter 5 to remove any particles of solid material therefrom and then passes through gear pump 6 to chamber 8. The amount of polyester pumped through conduit 2 may be greater than the amount drawn by gear pump 6, so a by-pass having valve 7 returns the excess to conduit 2 between storage tank 1 and pump 3. Chamber 8 is provided with a stirrer 9 having a plurality of blades and driven by variable-speed motor 11. The viscous liquid emerges from chamber 8 through conduit 24 and flows to mixing apparatus 13 which is preferably the apparatus disclosed in U.S. Patent 2,764,565. This mixing apparatus may be provided with a stirrer 14 driven by motor 15. Other components of the plastic composition are introduced into mixing chamber 13, such as, for example, from tank 20 through conduit 18 by means of pump 19 or other suitable means and from tank 21 through conduit 22 by means of pump 23 or other means. After the components have been thoroughly mixed together, they emerge from mixing chamber 13 through outlet 17. This outlet is provided with a thermocouple 16 or other suitable means for determining the temperature of the liquid and temperature controller 10 responds to the temperature of the liquid to actuate motor 11.

As an example of a method for making an elastic foam, a polyester prepared from about 16 mols of adipic acid, about 16 mols of diethylene glycol and about 1 mol of trimethylolpropane is pumped from storage tank 1 by pump 3 through heat exchanger 4 and filter 5. The filtered polyester is then pumped by means of gear pump 6 into mixing chamber 8 where it is stirred by stirrer 9 until the temperature has reached a predetermined point of say about 20° above room temperature. The heated polyester then flows through conduit 24 into mixing chamber 13 where it is mixed in the ratio of about 100 parts by volume thereof with about 25 parts toluylene diisocyanate from tank 20 and with an activated mixture of about 3 parts by volume adipic acid ester of normal diethylaminoethanol, about 2 parts by volume ammonium oleate and about 1.2 parts water from tank 21. The temperature of the mixture rises in chamber 13 and is determined by means of a temperature controller 10 and thermocouple 16. The temperature of the polyester in chamber 8 is then regulated based on the temperature of the liquid in outlet 17 by varying the speed of the stirrer 9.

In the drawing, a heat exchanger for cooling the polyester before it is filtered is provided, but in some embodiments such cooling means will not be required. Moreover, it may not be necessary to filter the polyester. Under such circumstances, the polyester may be pumped directly from the storage tank to the stirring chamber 8 where the temperature is adjusted depending upon the temperature of the effluent from mixing zone 13. Even though it may be necessary to use a water cooled heat exchanger or other means for cooling the polyester in some unusual instances, the size of the heat exchanger is much less than that usually required with heretofore available apparatus. Furthermore, the temperature of the polyester can be controlled more accurately than with the heretofore available apparatus. Heretofore available apparatus using conventional cooling means has frequently resulted in temperature gradients through the material. Since the temperature of the polyester and of the mixture of components in chamber 13 is determined by the temperature of the mixture of components as it leaves chamber 13, other variables such as the amount of agitation provided in the mixing nozzle, the temperature of the toluylene diisocyanate entering the reactor and the temperature of the activator mixture are compensated for and the temperature of the plastic composition emerging from the mixing nozzle is accurately controlled. In some embodiments it may be desirable also to stir the activator mixture or the polyisocyanate with or without the polyester in chamber 8 in order to raise the temperature of these materials before they enter mixing nozzle 13. Such a process is within the purview of this invention.

Any suitable temperature controller and actuating device may be used for actuating the motors that drive stirrer 9. One suitable temperature controller is described and shown in Bulletin 98151 published June 1950, and reprinted November 1953, by the Taylor Instrument Company. This particular controller also records the temperature which may be desirable but is not essential. A suitable temperature controller that does not record the temperature is described and shown in Bulletin 86R, published in March 1950, and reprinted in December 1953, by the Taylor Instrument Company. Either of these controllers or similar controllers may be used.

The following table indicates the effect of stirrer speed and flow rate on the final temperature of the plastic composition emerging from the mixing nozzle. Such results are obtained with typical polyesters such as the one described in the foregoing example.

| Stirrer, r.p.m. | lb./hr. Polyester (PE) | lb./hr. PE+TDI | Temp., PE Line | ° C., Mix Head | Temp., T ° C. | Diff., T ° F. | Work Input, B.t.u./hr. |
|---|---|---|---|---|---|---|---|
| 3,000 | 390 | 508 | 26 | 38.9 | 12.9 | 23.0 | 5,800 |
|  | 560 | 730 | 25 | 36.3 | 11.3 | 20.4 | 7,400 |
|  | 790 | 1,020 | 26 | 31.8 | 5.8 | 10.5 | 5,400 |
| Average |  |  |  |  |  |  | 6,200 |
| 1,000 | 390 | 508 | 25.8 | 28.0 | 2.2 | 4.0 | 1,000 |
|  | 560 | 730 | 26.0 | 27.3 | 1.3 | 2.3 | 840 |
| Average |  |  |  |  |  |  | 920 |

From these data it may be seen that the heat input varies as about the square of the speed of the stirrer.

Although the invention has been described in detail with respect to a particular polyester-polyisocyanate-activator mixture for making polyurethane foam, it is to be understood that the apparatus may be used with any other components for making plastics and that the apparatus provided for heating the viscous liquid is suitable for heating any viscous component of a plastic composition. Any suitable polyisocyanate and any suitable activator mixture including those disclosed in U.S. Patent 2,764,565 may be utilized.

The invention has been described in considerable detail in the foregoing for the purpose of illustration but modification can be made therein by those skilled in the art without departing from the spirit and scope of the invention except as set forth in the appended claims.

What is claimed is:

1. An apparatus for mixing chemically reactive components together and for controlling the temperature of the resulting mixture which comprises a mixing chamber, means for introducing at least two liquids separately into said mixing chamber, means for stirring at least one of said liquids outside said mixing zone prior to its introduction into said chamber until the temperature thereof increases, means for measuring the temperature of the resulting mixture, and means responsive to said temperature for varying the speed of said stirring means while continuing to stir the liquid, and thereby determining the temperature of the liquid being stirred.

2. An apparatus for making a polyurethane plastic comprising a mixing chamber, means for introducing at least two liquids into said chamber, means for intimately mixing the liquids together in said chamber, means for discharging the resulting mixture from the chamber, means for measuring the temperature of the mixture as it is discharged, a second chamber adapted to contain one of said liquids prior to its introduction into said mixing chamber, means for stirring said liquid in said second chamber, and means responsive to said temperature for varying the speed of said stirring means while continuing to stir the liquid, and thereby determining the temperature of the liquid in the second chamber.

References Cited in the file of this patent

UNITED STATES PATENTS

| | | |
|---|---|---|
| 1,598,289 | Lee | Aug. 31, 1926 |
| 2,036,217 | Jordan | Apr. 7, 1936 |
| 2,602,461 | Walker | July 8, 1952 |
| 2,706,108 | Miner | Apr. 12, 1955 |
| 2,808,235 | Sollich | Oct. 1, 1957 |

FOREIGN PATENTS

| | | |
|---|---|---|
| 169,358 | Great Britain | Sept. 29, 1921 |